United States Patent [19]
Aeschbach et al.

[11] Patent Number: 5,585,130
[45] Date of Patent: *Dec. 17, 1996

[54] CONCENTRATION OF ANTIOXIDANTS IN FATS

[75] Inventors: Robert Aeschbach, Vevey; Hans-Juergen Wille, Villeneuve, both of Switzerland

[73] Assignee: Nestec S.A., Vevey, Switzerland

[*] Notice: The term of this patent shall not extend beyond the expiration date of Pat. No. 5,492,709.

[21] Appl. No.: 517,140

[22] Filed: Aug. 21, 1995

Related U.S. Application Data

[63] Continuation-in-part of Ser. No. 339,946, Nov. 15, 1994, Pat. No. 5,492,709, and a continuation-in-part of Ser. No. 274,985, Jul. 13, 1994, abandoned.

[30] Foreign Application Priority Data

Aug. 17, 1993 [EP] European Pat. Off. .............. 93113120
Dec. 17, 1993 [EP] European Pat. Off. .............. 93120358
Feb. 10, 1994 [EP] European Pat. Off. .............. 94102007

[51] Int. Cl.$^6$ ..................................................... A23D 9/06
[52] U.S. Cl. ............................................ 426/542; 426/541
[58] Field of Search ...................................... 426/542, 541

[56] References Cited

U.S. PATENT DOCUMENTS

| | | |
|---|---|---|
| 2,115,073 | 4/1938 | Ingraham . |
| 3,732,111 | 5/1973 | Berner et al. . |
| 3,950,266 | 4/1976 | Chang et al. . |
| 4,900,565 | 2/1990 | Spies . |
| 5,017,397 | 5/1991 | Nguyen et al. . |
| 5,026,550 | 6/1991 | Aeschbach et al. . |
| 5,209,870 | 5/1993 | Todd, Jr. . |
| 5,227,183 | 7/1993 | Aung et al. . |
| 5,492,709 | 2/1996 | Aeschbach ............................ 426/542 |

FOREIGN PATENT DOCUMENTS

| | | |
|---|---|---|
| 1124192 | 1/1992 | Australia . |
| 2061980 | 2/1992 | Canada . |
| 0038959 | 3/1981 | European Pat. Off. . |
| 0040178 | 11/1981 | European Pat. Off. . |
| 58-208383 | 12/1983 | Japan . |
| 451340 | 7/1936 | United Kingdom . |
| 2184341 | 6/1987 | United Kingdom . |

OTHER PUBLICATIONS

Derwent Abstract No. AN 83–805282.

*Primary Examiner*—Carolyn Paden
*Attorney, Agent, or Firm*—Vogt & O'Donnell, LLP

[57] ABSTRACT

Antioxidant principles are concentrated in a fat by mixing the fat with a vegetable material containing phenolic antioxidants to obtain a mixture and pressing the mixture under a pressure of at least 40 bar. The fat concentrated with antioxidant principles may be added to a fat-containing food to protect the food from oxidation.

20 Claims, No Drawings

CONCENTRATION OF ANTIOXIDANTS IN FATS

CROSS REFERENCE TO RELATED APPLICATIONS

This application is a continuation-in-part of U.S. patent application Ser. No. 08/339,946, filed Nov. 15, 1994, now U.S. Pat. No. 5,492,709 and of U.S. patent application Ser. No. 08/274,985, filed Jul. 13, 1994 now abandoned.

BACKGROUND OF THE INVENTION

This invention relates to a process for the protection of a fat against oxidation, in which the fat to be protected is directly contacted with a vegetable material containing phenolic antioxidants.

In the food industry, antioxidants are used to retard the oxidative degradation of fats by inhibiting the formation of free radicals. The food-quality antioxidants normally used may be of synthetic origin, for example butyl hydroxyanisole (BHA) and butyl hydroxytoluene (BHT) (although the use of these antioxidants is being increasingly opposed in food legislation), but are preferably of natural origin, mainly vegetable origin emanating from plant extracts. Rosemary is at present the most widely used starting material in this field.

Various methods have been used to extract the antioxidant principles of vegetable materials and to convert into powder form or into more or less viscous liquids. Among the methods which lead to an antioxidant in powder form, a two-stage extraction involving the successive use of hexane and ethanol is proposed, for example, in European Patent Application Publication No. 0 307 626.

As an example of a process leading to a liquid antioxidant, European Patent Application Publication No. 0 507 064 describes a process for solubilizing antioxidants of vegetable origin in a medium-chain triglyceride (MCT) with the aid of solvents. Medium-chain triglycerides are liquid over a very broad temperature range, are capable of withstanding oxidative degradation and have a high dissolving potential for antioxidants of vegetable origin.

The problems addressed by the present invention were directly to dissolve antioxidants of vegetable origin in a fat to be protected by simple mechanical extraction, avoiding the use of solvents which would have to be eliminated. Where the fat is an oil, the objective was to provide a clear, non-thixotropic liquid solution of antioxidants of vegetable origin in a lipidic support which would not form any deposits on storage.

SUMMARY OF THE INVENTION

It has been found that simple pressing under certain pressure conditions, either with a screw press or with a hydraulic press, is sufficient to extract a large amount of antioxidants in a fat intended to be protected. This is surprising because known processes use polar solvents and more complicated means.

Accordingly, the present invention provides a process for concentrating antioxidant principles in a fat, including oils, characterized in that a vegetable material rich in phenolic antioxidants and the fat are contacted, after which the mixture is pressed under a pressure of, or higher than, 40 bar. If necessary, the extract issuing from the press is then filtered or clarified to remove suspended solids without eliminating the fat used.

The invention further provides a process for protecting a fat-containing food, cosmetic product or pharmaceutical product from oxidation, by incorporating in the lipidic phase thereof an effective amount of fat concentrated in antioxidant principles, as obtained from the process described above.

DETAILED DESCRIPTION OF THE INVENTION

Any vegetable material containing phenolic antioxidants may be used as the starting material. Suitable spice vegetable materials include rosemary, sage, thyme, oregano, marjoram, savory, ginger, and tumeric, either individually or in admixture. Also suitable are tomato skins, pimento skins and cocoa bean skins, either individually or in admixture. Among these starting materials of choice, rosemary is particularly preferred, because it contains the antioxidants carnosic acid and carnosol, which are odourless, colourless and substantially tasteless.

The starting vegetable material may be fresh, whole or more or less finely ground. It may be stripped with steam to eliminate most of the odoriferous principles, which are unwanted for certain applications where the antioxidant is required to be as neutral as possible. In other cases, it is desired to retain at least part of the odoriferous principles of the spices in the liquid antioxidant, in which case the starting material is not stripped. It is preferably in dried form whether or not it has been ground or stripped.

The fat used as a vehicle may be selected from fats of animal or vegetable origin which are sensitive to oxidation and which contain unsaturated fatty acids, including for example chicken fat, lard and palm oil, which tend to be apolar. When an oil is used, it should be liquid at ambient temperature, should be a good solvent for the antioxidant principles and should be stable to oxidation, even at high temperatures. Such oils may be selected from a mixture of saturated $C_{6-12}$ fatty acid triglycerides, olive oil, a hybrid safflower/sunflower oil, a hydrogenated and fractionated, non-lauric vegetable cottonseed or soybean oil. A polar triglyceride, for example of the medium chain type (MCT), containing caprylic and captic acids is preferably used.

The vegetable starting material and the fat may be combined and mixed at ambient or elevated temperature, depending upon the fat used and the desired results. The fat is preferably melted beforehand, for example at 60° to 80° C. and then mixed with vegetable material at an elevated temperature, preferably in the range from 90° to 120° C. Oils which are liquid at ambient temperature may be mixed with the vegetable material at ambient temperature, i.e., at around 20° C., particularly where it is desired to retain at least part of the odoriferous principles of a starting material consisting of a cocktail of spices. Mixing may also be carried out at high temperatures of 100° to 140° C., and preferably of the order of 120° C., in cases where it is desired to produce a neutral antioxidant.

This pretreatment which precedes pressing may be carried out, for example, with intensive stirring in a mixer, in a scraped-surface heat exchanger or in an UHT steam injector using superheated steam. The pretreatment is preferably carried out for 60 to 90 minutes in a mixer to achieve suitable extraction of the antioxidants. In cases where a scraped surface heat exchanger or a steam injector is used, the pretreatment time is preferably from a few seconds to a few minutes.

It has been found to be of advantage to carry out the pretreatment in the presence of water by adding water to the mixture, preferably in a quantity of 10 to 20% by weight, based on the starting material, to increase the amount of antioxidant extracted.

In addition, in the case of rosemary for example, an enzymatic pretreatment of the starting material enables the extraction yield to be improved by 20% to 30%. To this end, the vegetable material, for example rosemary leaves, is incubated with 1% by weight of a glucanase in aqueous medium, for example for around 4 hours with stirring at a temperature of around 40° C., after which the suspension is filtered or centrifuged and the vegetable material thus treated is dried.

The ratio by weight of fat to vegetable material is selected to obtain an acceptable concentration of antioxidant in a high yield and may be 0.3 to 2.5:1, preferably 0.5 to 2.5:1. In the case of oils, such as MCT, the ratio by weight of oil to vegetable material is preferably 0.3 to 0.7:1.

The pretreatment is followed by extraction under high pressure of the suspension of vegetable material in the fat. A screw press or a piston press may be used for this purpose. The pressure applied is progressively increased, for example in stages to a value of 40 bar or higher and maintained for one or more hours. Where a piston press is used, it is preferably equipped with a filter at its exit, which advantageously moves suspended solids from oils.

In cases where a screw press is used, it is important to ensure that the starting mixture contains a minimum quantity of vegetable material to achieve a consistency of the dispersion capable of promoting a sufficient pressure drop to establish the pressure, thereby preventing the overly diluted fat from issuing without an extraction effect. After extraction, the crude oil extracted has to be treated to eliminate the residues of suspended vegetable material, for example by filtration or centrifugation.

In cases where a piston press is used, the pressure applied is progressively increased, for example in steps to a value of 40 bar or higher, and is kept at that level for one hour or several hours.

In this case, both pressing and filtration have to be carried out rapidly to avoid cooling during which the fat could solidify. To reduce this risk, the body of the press is advantageously heated.

In order further to increase the quantity of antioxidant incorporated and better to utilize the vegetable starting material, the extraction may be repeated by recycling a first extract of antioxidant in the preheated fat or oil by contacting it with another batch of vegetable material and pressing. A fat containing up to 7% by weight of antioxidant can be obtained in this way.

Depending on the type of vegetable material used, for example a spice, and the type of application envisaged, it may be necessary to decolour and deodorize the fat containing the antioxidant. The fat may be decoloured by mixing with active carbon or bleaching clay, heating and filtering. The substances responsible for the colour are thus retained on the adsorbent.

For deodorization, the fat is preferably distilled in vacuo, for example in countercurrent in a falling-film or thin-layer apparatus using superheated steam.

The present invention also relates to the use of a fat treated as described above for protecting a food against oxidation. To this end, it may be used in the concentrated form in which it accumulates after extraction and mixed with the fat to be stabilized, so that the concentrate is diluted and the antioxidant content adapted to the product to be protected.

The protected fat may also be used, for example in the form of the concentrate mentioned above, to protect the fatty phase of a food, for example a meat, a stock, a sauce, a soup or a cream. In this case, the concentrate is mixed with the remainder of the fat to obtain the desired fat content dictated by the recipe.

EXAMPLES

The invention is illustrated by the following Examples, in which parts and percentages are by weight, unless otherwise stated.

Example 1

3 kg of chopped rosemary leaves are mixed with 1.5 kg of chicken fat preheated to 60° C. in the presence of 300 g of demineralized water. After treatment for 1 hour at 100° C. in a LÖDIGE mixer, the mixture is pressed in a KOMET press with an R8L screw of which the head is heated to 140° C. and of which the outlet orifice has a diameter of 6 mm. 2.9 kg of a cake are separated and 1.1 kg of crude liquid fat is collected. This crude fat is heated to 60°–80° C. and then clarified in a PADBERG centrifuge operating at 14,000 r.p.m. 0.8 kg of stabilized chicken fat is thus obtained. The yield of clarified fat is 53.3% (based on the chicken fat used).

Example 2

The procedure is the same as in Example 1, except that 500 g of lard preheated to 80° C. are mixed with 1 kg of chopped sage leaves in the presence of 200 g of demineralized water. A crude molten fat containing 1.59% of antioxidant (analyzed as the sum of carnosol and carnosic acid by high-performance liquid chromatography, HPLC) is obtained. The yield based on the fat used is 57.8%.

Example 3

The procedure is as in Example 2, except that the fat to be protected is chicken fat. A crude molten fat containing 1.52% of antioxidant is obtained in a yield of 87.4%, based on the chicken fat used.

Example 4

1 kg of chopped rosemary leaves stripped with steam are moistened with 200 g of water, then the whole is mixed for 20 minutes in a LÖDIGE mixer in which the double wall is heated with steam to 120° C. 500 g of chicken fat preheated to 60° C. are then added and the whole is stirred for 60 minutes at 100° C. in the mixer. Immediately after the pretreatment, pressing is carried out fro 60 minutes with still molten fat under a pressure of 500 bar in a CARVER piston press equipped with a filter cage and a crude fat containing 1.11% of antioxidant is collected in a yield of 33.7%, based on the fat used.

Example 5

The procedure is as described in Example 4, except that 1 kg of chicken fat is used. A crude fat containing 0.77% of antioxidant is obtained in a yield of 69%, based on the fat used.

Example 6

The procedure is as described in Example 4, except that 2 kg of chicken fat is used. A crude fat containing 0.5% of antioxidant is obtained in a yield of 80.9%, based on the fat used.

Example 7

The procedure is as described in Example 4, using the same ratios of vegetable material to fat, except that the fat used is palm oil. A crude fat containing 1.21% of antioxidant is obtained in a yield of 34%, based on the fat used.

Example 8

1 kg of non-stripped dry sage leaves is stirred with 200 ml of demineralized water in a mixer in which the double wall is heated to 120° C., and then with 500 g of chicken fat—preheated to 60° C.—for 1 h at 100° C., followed by hot pressing in a CARVER piston press equipped with a filter cage. A crude fat containing 1.31% of antioxidant is thus obtained in a yield of 38.3%, based on the fat used.

Example 9

The procedure is as described in Example 8, except that the fat treated is lard. A crude fat containing 1.31% of antioxidant is obtained in a yield of 38.3%, based on the fat used.

Example 10

250 ml of MCT are added with stirring to 500 g of chopped rosemary leaves which have been stripped with steam and the whole is kept for 60 minutes at 100° C. in a LÖDIGE mixer. After pressing for 60 minutes at 500 bar in a CARVER piston press equipped with a filtration cage, a clear oil containing 1.76% of antioxidant (analyzed as the sum of carnosol and carnosic acid by high-performance liquid chromatography, HPLC) is collected. The yield is 63% (based on the MCT used).

Example 11

The procedure is as in Example 10, except that 250 ml of demineralized water are added to the chopped and stripped rosemary leaves before they are mixed with the MCT. A clear oil containing 2.11% of antioxidant is obtained. The yield, based on the MCT used, amounts to 57%.

Example 12

40 kg of steam-stripped and ground rosemary are moistened with 4 kg of demineralized water with stirring for 20 minutes at 120° C. in a LÖDIGE mixer. 20 kg of MCT are then added at 100° C., after which the mixture is homogenized for 60 minutes at 100° C. The mixture is then pressed for 3 h at 70 bar in a FUJIWARA piston press equipped with a filtration cage. A clear oil containing 4.8% of antioxidant is obtained in a yield of 66%, based on the MCT used.

Example 13

1 kg of non-stripped and ground rosemary leaves are treated with 100 ml of water and 500 ml of non-lauric vegetable oil rich in C18:1 trans, DURKEX LC 550, for 1 h at 100° C. Pressing as in Example 10 leads to a clear oil containing 1.3% of antioxidant in a yield of 55% (based on the oil used).

Example 14

3 kg of stripped and ground rosemary are treated with 300 ml of demineralized water containing 1.5 kg of MCT for 60 minutes at 100° C. The mixture is then pressed as in Example 10 and 730 g of clear extract are collected. 1.46 kg of stripped and ground rosemary and 146 ml of demineralized water are added to the extract after which the mixture is treated for another 60 minutes at 100° C. and pressed as before. A clear oil containing 3.5% of antioxidant is thus collected.

Example 15

740 g of non-stripped and ground rosemary are treated with 7.5 g of GLUCANEX (Novo) for four hours at 40° C./pH 4 in the presence of 4.5 l of water, after which the mixture is filtered and the residue is dried. 75 ml of demineralized water and then 370 g of MCT are added to the enzymatically treated vegetable material, after which the mixture is treated for 1 h at 100° C. Finally, the mixture is pressed as in Example 10 and a clear oil containing 1.95% of antioxidant is collected in a yield of 74%, based on the MCT used.

Example 16

The same treatment as in Example 15 with 1% of enzyme OLIVEX (Novo) for 4 h at 35° C./pH 5.3 gives a clear oil containing 1.8% of antioxidant.

Example 17

The treatment of rosemary as in Example 15 with the enzyme ROHAMENT CT (Rohm) for 4 h at 45° C./pH 4 gives a clear oil containing 1.85% of antioxidant.

Example 18

The same treatment as in Example 15 with the enzyme ROHAMENT O (Rohm) for 4 h at 50° C./pH 4.5 gives a clear oil containing 1.8% of antioxidant.

Example 19

200 g of dry non-stripped sage leaves are treated with 100 ml of demineralized water and then with 100 g of MCT for 1 h at 100° C., after which the mixture is pressed as in Example 10 in a CARVER piston press equipped with a filtration cage. A clear oil is obtained in a yield of 68%, based on the MCT used.

Example 20

100 g of a cocktail of Provencal spices comprising 40% of rosemary, 20% of sage, 20% of thyme and 20% of oregano are treated as in Example 19 in the presence of 10 ml of demineralized water and 50 g of MCT except that the treatment is carried for 1 h at 20° C. After pressing, a clear oil is collected in a yield of 79%, based on the MCT used.

Example 21

The same treatment as in Example 20 with 100 g of a cocktail of oriental spices comprising 50% of ginger, 25% of turmeric and 25% of cayenne pepper gives a clear oil in a yield of 88%, based on the MCT used.

Example 22

The same treatment as in Example 20 with 500 g of dry cocoa bean skins in the presence of 100 ml of demineralized water and 250 g of MCT, the extraction step being carried out at 100° C., gives a yellow-coloured oil in a yield of 33%, based on the MCT used.

Example 23

To protect a batch of fat intended for use in a food, a portion of stabilized fat in the form of a concentrate is added to the batch of fat in a proportion of 1 part of concentrate to 500 parts or 100 parts of untreated fat. The treated fat used is preferably of the same type as the untreated fat.

The protection factor is measured by using the accelerated RANCIMAT oxidation test described in Example 13 of European Patent Application Publication No. 0 326 829, but at a temperature of 110° C. The induction time of the fat protected by the portion of fat stabilized by the process according to the invention is determined by adding 0.2% or 1% of stabilized fat to the fat to be protected and is placed in a ratio to the reference induction time of the unstabilized fat, which gives the antioxidant index. The results are set out in Table I below:

TABLE I

| Fat, quantity (%) | | Antioxidant index |
|---|---|---|
| Lard | 0.2 | 4 |
| Chicken fat | 0.2 | 3.4 |
| Chicken fat | 0.2 | 6.1 |
| Chicken fat | 0.2 | 3.9 |
| Chicken fat | 0.2 | 3 |
| Palm oil | 1 | 1.7 |
| Chicken fat | 0.2 | 3.5 |
| Lard | 0.2 | 3.7 |

We claim:

1. A process for concentrating antioxidant principles in a fat comprising mixing a fat and a vegetable material containing phenolic antioxidants to obtain a mixture and pressing the mixture under a pressure of at least 40 bar to obtain a fat concentrated with antioxidant principles, wherein the vegetable material is selected from the group consisting of rosemary, sage, thyme, oregano, marjoram, savory, ginger, tumeric, tomato skin, pimento skin and cocoa bean skin.

2. A process according to claim 1 wherein the fat and vegetable material are present in the mixture in a ratio of 0.5 to 2.5:1.

3. A process according to claim 1 wherein the fat is an oil and the oil and vegetable material are present in the mixture in a ratio of 0.3 to 0.7:1.

4. A process according to claim 1 wherein the fat is an oil selected from the group consisting of saturated $C_{6-12}$ fatty acid triglycerides; olive oil; hybrid safflower/sunflower oil; hydrogenated and fractionated non-lauric vegetable cottonseed oil; and soybean oil.

5. A process according to claim 1 further comprising, before pressing, combining water with the fat and vegetable material in an amount of 10% to 20% by weight, based upon the weight of the vegetable material.

6. A process according to claim 1 further comprising mixing the fat concentrated with antioxidant principles with a second portion of a vegetable material containing phenolic antioxidants to obtain a second mixture and pressing the second mixture under a pressure of at least 40 bar to obtain a fat further concentrated with antioxidant principles.

7. A process according to claim 1 wherein the fat is an oil and the vegetable starting material and the oil are mixed at ambient temperature.

8. A process according to claim 1 wherein the fat and vegetable material are mixed at a temperature of from 90° C. to 140° C.

9. A process according to claim 1 further comprising, before mixing with the fat, incubating the vegetable material with a glucanase in an aqueous medium.

10. A process according to claim 1 wherein the mixture is pressed in a piston press equipped with a filter cage at a temperature such that the fat does not solidify.

11. A process according to claim 1 wherein the mixture is pressed in a screw press and further comprising, after pressing, removing residues of vegetable material from the pressed fat.

12. A process according to claim 1 wherein the vegetable material is rosemary.

13. A process according to claim 1 wherein the vegetable material is sage.

14. A process according to claim 1 wherein the fat is of animal origin.

15. A process according to claim 1 wherein the fat is chicken fat.

16. A process according to claim 1 wherein the fat is lard.

17. A process according to claim 1 wherein the fat is of vegetable origin.

18. A process according to claim 1 wherein the fat is palm oil.

19. A process for protecting a fat-containing food against oxidation comprising adding a fat concentrated with antioxidant principles obtained from the process of claim 1 to a fat-containing food.

20. A process for protecting the lipidic phase of a cosmetic product or a pharmaceutical product comprising incorporating therein an effective quantity of a fat concentrated with antioxidant principles obtained from the process of claim 1.

* * * * *